(12) United States Patent
Arroyo et al.

(10) Patent No.: US 10,985,916 B2
(45) Date of Patent: Apr. 20, 2021

(54) OBFUSCATION OF KEYS ON A STORAGE MEDIUM TO ENABLE STORAGE ERASURE

(71) Applicant: International Business Machines Corporation, Armonk, NY (US)

(72) Inventors: Diana Arroyo, Austin, TX (US); Jia Jun Brandon Lum, White Plains, NY (US); Alaa Youssef, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 15/798,721

(22) Filed: Oct. 31, 2017

(65) Prior Publication Data
US 2019/0132125 A1  May 2, 2019

(51) Int. Cl.
| | |
|---|---|
| *H04L 9/08* | (2006.01) |
| *G06F 21/76* | (2013.01) |
| *G06F 21/62* | (2013.01) |
| *G06F 21/80* | (2013.01) |
| *G06F 21/78* | (2013.01) |

(52) U.S. Cl.
CPC ............ *H04L 9/0869* (2013.01); *G06F 21/62* (2013.01); *G06F 21/76* (2013.01); *G06F 21/78* (2013.01); *G06F 21/80* (2013.01); *H04L 9/085* (2013.01); *H04L 9/0894* (2013.01); *G06F 2221/2107* (2013.01); *G06F 2221/2143* (2013.01); *H04L 2209/12* (2013.01); *H04L 2209/16* (2013.01)

(58) Field of Classification Search
USPC ..................................................... 380/277
See application file for complete search history.

(56) References Cited

U.S. PATENT DOCUMENTS 7,734,043 B1  6/2010  Jefferson et al.
8,891,768 B2  11/2014  Pogmore
(Continued)

FOREIGN PATENT DOCUMENTS

JP      2014116753 A  *  6/2014  ............... H04L 9/10

OTHER PUBLICATIONS

Michal Wei, et al., Reliably Erasing Data From Flash-Based Solid State Drives, Proceedings of the 9th USENIX conference on File and storage technologies, 2011.
(Continued)

*Primary Examiner* — Andrew J Steinle
*Assistant Examiner* — Sakinah White Taylor
(74) *Attorney, Agent, or Firm* — Harrington & Smith

(57) ABSTRACT

An apparatus receives a signal to perform secure erasure of a storage medium. The apparatus, responsive to reception of the signal, erases the storage medium by performing at least the following operations. An encryption key is erased. The encryption key is stored on the storage medium and is used to encrypt data on the storage medium. The apparatus generates a fake encryption key that is different from the encryption key and stores storing the fake encryption key on the storage medium. The encryption key and/or fake encryption key may be stored on the medium in multiple parts. The encryption key may be generated using random data from the medium. The apparatus may be the storage medium or a computer system that access the storage medium. The erasure can be performed in response to a request by a user. The medium may be an erasure-resistant storage medium.

20 Claims, 8 Drawing Sheets

(56) References Cited

U.S. PATENT DOCUMENTS

| | | | | |
|---|---|---|---|---|
| 9,268,961 B2* | 2/2016 | Okamoto | ............ | G06F 21/6218 |
| 2007/0288768 A1* | 12/2007 | Nesta | .................. | G06F 21/6209 |
| | | | | 713/194 |
| 2009/0196417 A1* | 8/2009 | Beaver | .................... | G06F 21/80 |
| | | | | 380/45 |
| 2010/0150341 A1* | 6/2010 | Dodgson | ............... | G06F 21/805 |
| | | | | 380/29 |
| 2013/0305057 A1 | 11/2013 | Greco et al. | | |
| 2016/0150047 A1* | 5/2016 | O'Hare | ................. | G06F 3/0619 |
| | | | | 713/168 |
| 2016/0364343 A1* | 12/2016 | Case | ..................... | H04L 9/0637 |
| 2017/0033927 A1 | 2/2017 | Windle et al. | | |
| 2018/0121670 A1* | 5/2018 | Thibadeau, Sr. | ........ | G06F 21/31 |

OTHER PUBLICATIONS

Steven Swanson, et al., "SAFE: Fast, Verifiable Sanitization for SSDs", Revision v0.6.2, 2010, downloaded from https://cseweb.ucsd.edu/~swanson/papers/TR-cs2011-0963-Safe.pdf on Sep. 20, 2017.

Adi Shamir, "How to Share a Secret", 1979, downloaded from http://www.cs.tau.ac.il/~bchor/Shamir.html on Sep. 20, 2017.

* cited by examiner

OBFUSCATION OF KEYS ON A STORAGE MEDIUM TO ENABLE STORAGE ERASURE

BACKGROUND

This invention relates generally to data on storage media, such as data on erasure-resistant storage media like solid state drives and, more specifically, relates to obfuscation of keys on (e.g., an erasure-resistant) storage medium to enable storage erasure.

Electronics are pervasive in our lives at home and at work. Such electronics many times contain non-volatile memory media. This memory media may take many forms, such as Solid State Drives (SSDs), Hard Disk Drives (HDDs), secure digital (SD) memory cards, or memory sticks. At some point, it is beneficial to erase this memory, such as when transferring an electronic device to someone else or throwing away the device or even the medium itself, if the medium is separable from the device.

One problem is that it is difficult to securely erase data on erase-resistant media such as SSDs or HDDs. The traditional approach of secure erasure of data is by writing zeros/random data to the medium multiple times. More recent methods include storing data encrypted on the medium, and subsequently performing the perceived erasure of data through erasing the encryption key. Once the encryption key is erased, it is assumed the data can no longer be read.

However, this relies on the storage device providing a method of securely deleting a sector, e.g., upon which is some of or the entire encryption key. With a storage medium such as an SSD, a traditional write to the drive does not guarantee erasure of data. Thus, such storage devices often provide some variant of a secure erase interface. Nonetheless, not all devices provide such functionality, and some that do provide this functionality do not perform as expected.

Abbreviations that may be found in the specification and/or the drawing figures are defined below, after the main part of the detailed description section.

SUMMARY

This section is meant to be exemplary and not meant to be limiting.

In an exemplary embodiment, a method includes receiving, by an apparatus, a signal to perform secure erasure of a storage medium, and erasing, by the apparatus and responsive to reception of the signal, the storage medium by performing operations comprising: erasing an encryption key that is stored on the storage medium and that is used to encrypt data on the storage medium; generating a fake encryption key that is different from the encryption key; and storing the fake encryption key on the storage medium.

In another exemplary embodiment, an apparatus is disclosed. The apparatus comprises circuitry configured to cause the apparatus to perform the following: receiving, by the apparatus, a signal to perform secure erasure of a storage medium; and erasing, by the apparatus and responsive to reception of the signal, the storage medium by performing operations comprising: erasing an encryption key that is stored on the storage medium and that is used to encrypt data on the storage medium; generating a fake encryption key that is different from the encryption key; and storing the fake encryption key on the storage medium.

In an additional exemplary embodiment, a computer program product is disclosed. The computer program product comprises a computer readable storage medium having program instructions embodied therewith, the program instructions executable by an apparatus to cause the apparatus to perform operations comprising: receiving, by an apparatus, a signal to perform secure erasure of a storage medium; and erasing, by the apparatus and responsive to reception of the signal, the storage medium by performing operations comprising: erasing an encryption key that is stored on the storage medium and that is used to encrypt data on the storage medium; generating a fake encryption key that is different from the encryption key; and storing the fake encryption key on the storage medium.

DETAILED DESCRIPTION

Figure 1:
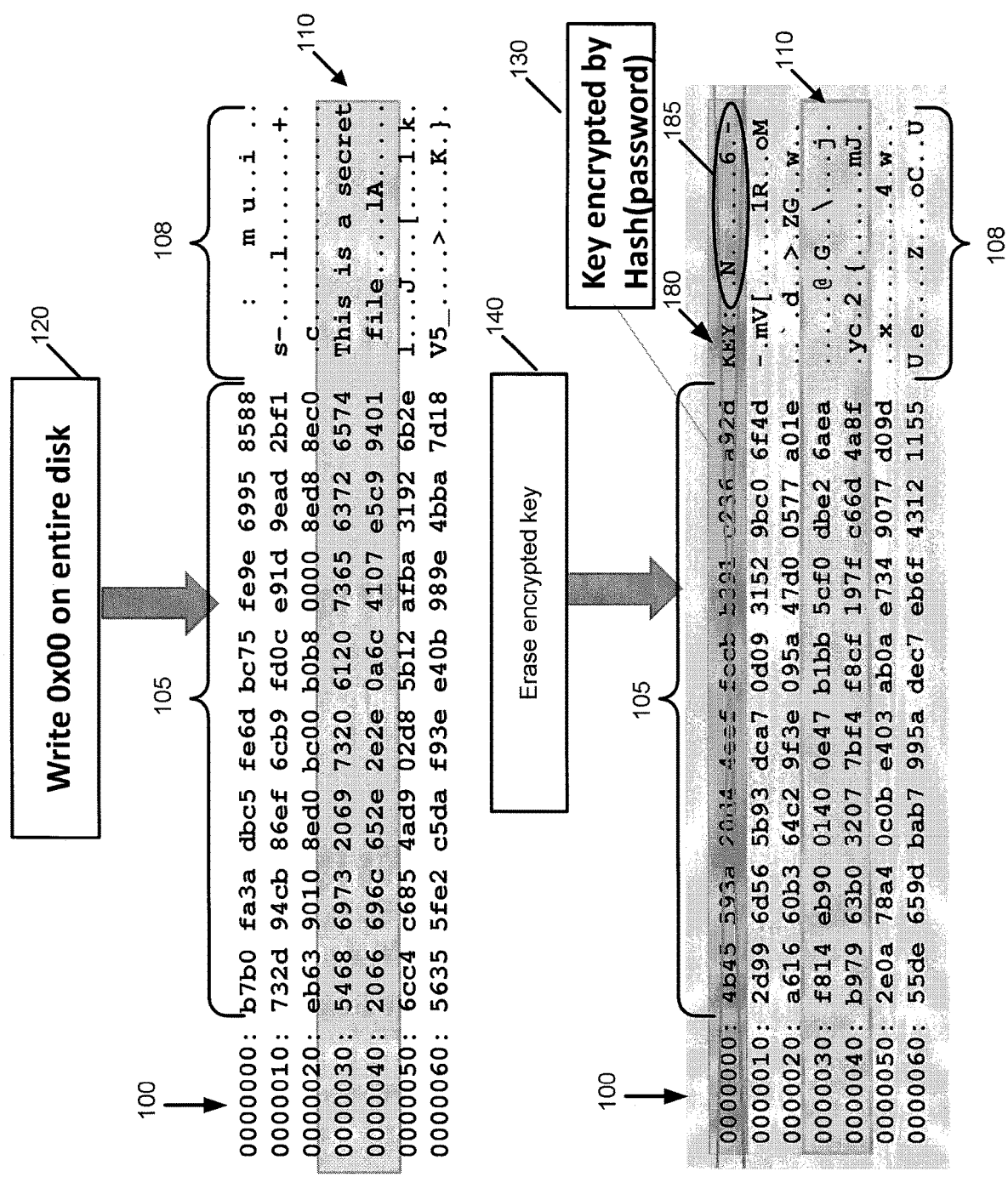
FIG. 1A illustrates one version of disk scrubbing using traditional shredding.
FIG. 1B illustrates another version of disk scrubbing using encryption.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Before proceeding with additional detail, it is noted that some terms are used interchangeably herein. For instance, memory and storage are used interchangeably, as are memory and medium (or media). This occurs because memory stores information and therefore is storage, and memory is formed via a medium (or media) containing that memory. Additionally, while the term "medium" is primarily used herein for a single physical device, this is for ease of exposition and it should not be construed that the term "medium" excludes "media". For instance some devices may contain multiple media types, such as a hard drive that contains both an SSD and platters.

As described above, one problem is that it is difficult to securely erase data on erase-resistant media such as SSDs, HDDs, SD (or other) memory cards, or memory sticks. The term "erasure-resistant" is defined herein as the inability to ensure the erasure of data on storage media in respect to a certain scenario. We say with respect to a certain scenario, since it is technically possible to securely erase most media by physical destruction. The scenario used herein is that physical destruction is not used and instead electronic techniques will be used to (e.g., attempt to) erase data on storage media.

FIGS. 1A and 1B illustrate a technique of disk scrubbing, which is used to erase storage media. In FIG. 1A, data scrubbing using traditional shredding is illustrated, and in FIG. 1B, data scrubbing using encryption is illustrated. Both figures show a data area 105, each row of which is indexed via indexes 100. Reference 108 illustrates an ASCII (American Standard Code for Information Interchange) representation of the data.

In FIG. 1A, reference 110 indicates a region of the data area 105 that contains a secret file, as illustrated by "This is a secret file" in the ASCII representation 108. One technique for data scrubbing is to write 0x00 (that is, zero in hexadecimal) on the entire disk. See reference 120. The 0x00 would be written to each element in the data area 105.

FIG. 1B illustrates that a key is used to encrypt the data. Reference 130 indicates the key encrypted by a hash of a password is stored in the first row (at index 0000000) of the data area 105. This comprises a key header 180 (illustrated as "KEY") and the encrypted key data 185. One technique for data scrubbing is to erase the encrypted key (see reference 140), by erasing the data in the first row of the data area. Such erasure may entail, e.g., overwriting this region multiple times with random data.

Unfortunately, even over-writing data multiple times on a HDD may not completely delete the data. Additionally SSDs and similar storage media have their own sets of problems. Specifically, SSDs use Copy on Write (COW) and a logical erasure does not equate to a physical erasure. Retrieving the medium with the data area 105 on it can therefore can allow an attacker to be able to read erased data. Some SSDs have a secure erase function built in, but some do not. Some manufacturers also advertise their SSDs have one, but tests have shown they do not implement it correctly.

Concerning the encryption technique used in FIG. 1B, this technique means all reads require decrypting data and all writes require encrypting data, both of which use the key. For normal encryption key storage, in common encryption volumes, the key is usually in a region containing a header and other artifacts such as metadata. The key header is something that is usually known. It usually follows a certain structure. For example, the first few bytes would have the bytes that represent "KEY" and following that, the next few bytes would say what the length of the key is and indicate the key type according to some specification of the encryption device, followed by the key itself.

Figure 2:
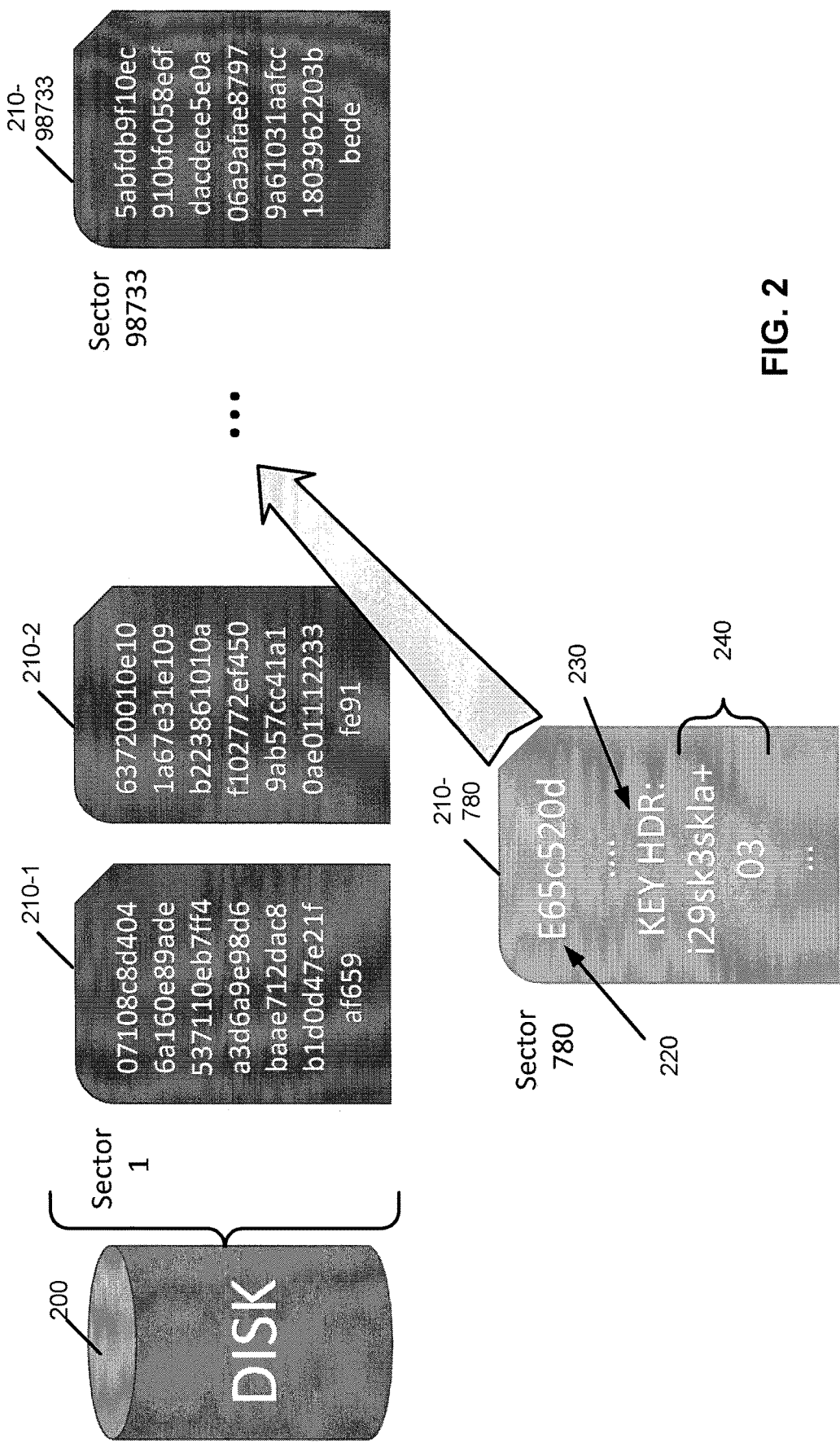
FIG. 2 illustrates normal encryption key storage.

An example of this normal encryption key storage is illustrated in FIG. 2, which shows a disk 200 and sectors 1 (210-1), 2 (210-2), 780 (210-780), and 98733 (210-98733). The sectors 210-1, 210-2 and 210-98733 contain random data. The sector 210-780 also contains some random data 220, but then contains a stored encryption key, stored by using a key header (KEY HDR) 230 followed by the (e.g., encrypted) key data 240. Other information may also be stored as previously described, such as the length of the key and/or key type.

In a common encryption situation, the key is guessable by looking for the key header 230 in sectors 210. If someone knows what the key header looks like, the sectors 210 can then be searched for the header, and the key can be found.

By contrast, in exemplary embodiments herein, an effort is made to protect the header and make the key unguessable. For instance, the header may be encrypted with a strong key, i.e., 256 bits of security at least. A symmetric cipher like AES may be used, as an example. The key is also stored on disk in a way that would make it unguessable after erasure even with imperfect cleaning. In particular, instead of storing the key in one place, it is proposed in exemplary embodiments to perform sharding of the key. Under this process, the key is split into multiple parts and stored in different sectors/blocks of the disk. The key is reconstructed as a function of the different parts. Furthermore, for erasure, after the key is erased, fake key parts are spread about the disk, to confuse anyone trying to find remnants of the erased key. Additional detail about these techniques is provided after an exemplary system is described in which the exemplary embodiments may be practiced.

Figure 3:
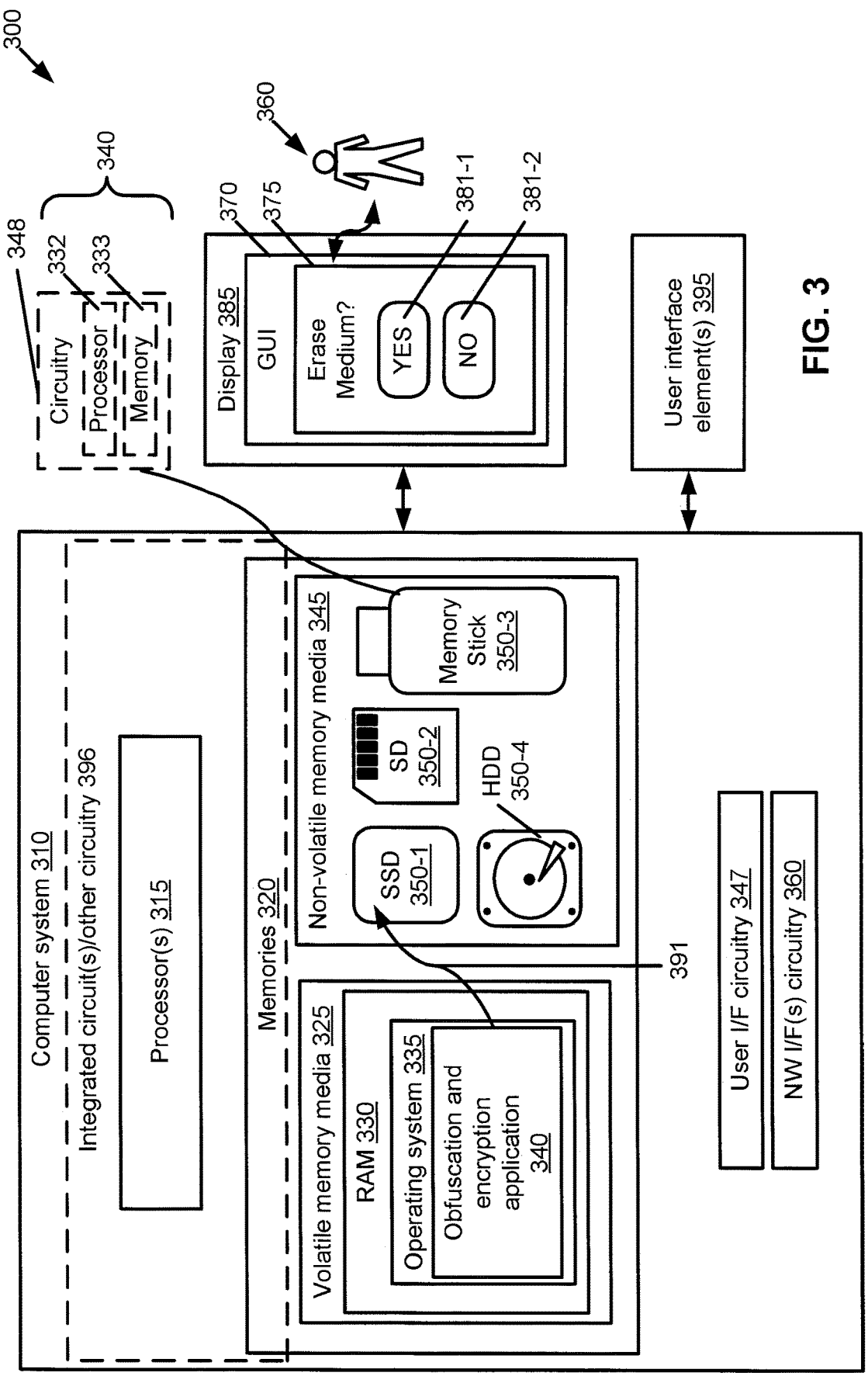
FIG. 3 is a block diagram of an exemplary system in which the exemplary embodiments may be practiced.

Turning to FIG. 3, this figure is a block diagram of an exemplary system in which the exemplary embodiments may be practiced. The system 300 comprises a computer system 310, a display 385, and one or more user interface (UI) elements 395. The computer system 310 comprises one or more processors 315, one or more memories 320, user interface (I/F) circuitry 347, and network (NW) interfaces (I/F(s)) circuitry 360. The one or more memories 320 comprise volatile memory media 325 and non-volatile memory media 345. The one or more processors 315 and part of the memories 320 may be formed using one or more integrated circuits/other circuitry (such as programmable logic devices) 396. The volatile memory media 325 comprises random access memory (RAM) 330 (such as addressable semiconductor memory), which comprises an operating system (OS) 335, which itself comprises an obfuscation and encryption application 340. The non-volatile memory media 345 comprises examples of erasure-resistant storage media 350. This list of media is not exhaustive and is non-limiting. The non-volatile memory media 345 comprises one or more of an SSD 350-1, an SD card 350-2, a memory stick 350-3, and an HDD 350-4. The display 385 comprises a graphical user interface (GUI) 370, a window 375 and two buttons 381-1 (YES) and 381-2 (NO) within the window 375.

A user (a human being) 360 can interact with the system 300 using one or more of the display 385 and the user interface element(s) 395. The user I/F circuitry 347 provides the circuitry for the computer system 310 to interact with the display 385 and the UI element(s) 395. The user interface element(s) 395 include physical elements such as keyboards, mice, trackballs, and the like. Although the display 385 and UI element(s) 395 are illustrated in FIG. 1 as being separate from the computer system 310, one or both of them may be integrated with the computer system 310. For instance, the computer system 310 could be a touch screen laptop, a tablet, a smartphone, a wearable device such as a smartwatch or glasses, and the like. The computer system 310 could also be a personal computer, laptop without touchscreen, server, television, or any other device that contains (or can communicate with) erasure-resistant storage media.

The NW I/F circuitry 360 allows the computer system 310 to interact with local or remote networks (not shown), such as short-range wireless networks and wired or wireless long range networks.

The one or more processors 315 may be single or multi-core processors, a system-on-a-chip, graphics processing units, application-specific integrated circuits, or combination of these. The volatile memory media 325 may be dynamic RAM, static RAM, or other memory that does not retain data without power. The non-volatile memory media 345 may be any memory that retains data without power.

The obfuscation and encryption application 340 in this example is built into the OS 335, and the user 360 interacts with the obfuscation and encryption application 340 (and the OS 335) using the GUI 370. The computer system 310, in response to retrieval and execution of the obfuscation and encryption application 340, performs the operations described herein. In the example of FIG. 1, the user 360 can choose to erase one or more of the erasure-resistant storage media 350 by selecting one of the buttons 381-1 (YES) or 381-2 (NO) on the window 375 of the GUI 370. In an exemplary embodiment, the obfuscation and encryption application 340 creates the window 375 and its buttons 381 and also responds to the user's choice of buttons. The obfuscation and encryption application 340 is shown in the volatile memory media 325, but the application 340 may be initially stored in the non-volatile memory media 345 and loaded into volatile memory media 325 for execution.

It is also noted that part of obfuscation and encryption application 340 may be built into the erasure-resistant storage medium 350, such as being incorporated in firmware and integrated circuits of the medium. This is illustrated by reference 391. It is assumed the erasure-resistant storage media 350 would have circuitry 348 comprising, e.g., a processor (or processors) 332 and memory 333 (e.g., as integrated circuit(s)) that would be programmed to perform the obfuscation and encryption application 340. This programming may be entirely "built in" (e.g., via gates and other devices on an integrated circuit) as part of the circuitry 348 (e.g., in the processor 332) or part of a program 340 stored in memory 333 or both. This may still necessitate some type of application (or "app") so that the user 360 can cause erasure of the media 350, and that application would be implemented in the computer system 310 and send a signal to the medium 350 to begin the erasure process.

Having thus introduced one suitable but non-limiting technical context for the practice of the exemplary embodiments, the exemplary embodiments will now be described with greater specificity. Possible techniques for these embodiments are best illustrated by a flowchart, as illustrated by FIG. 4.

Figure 4:
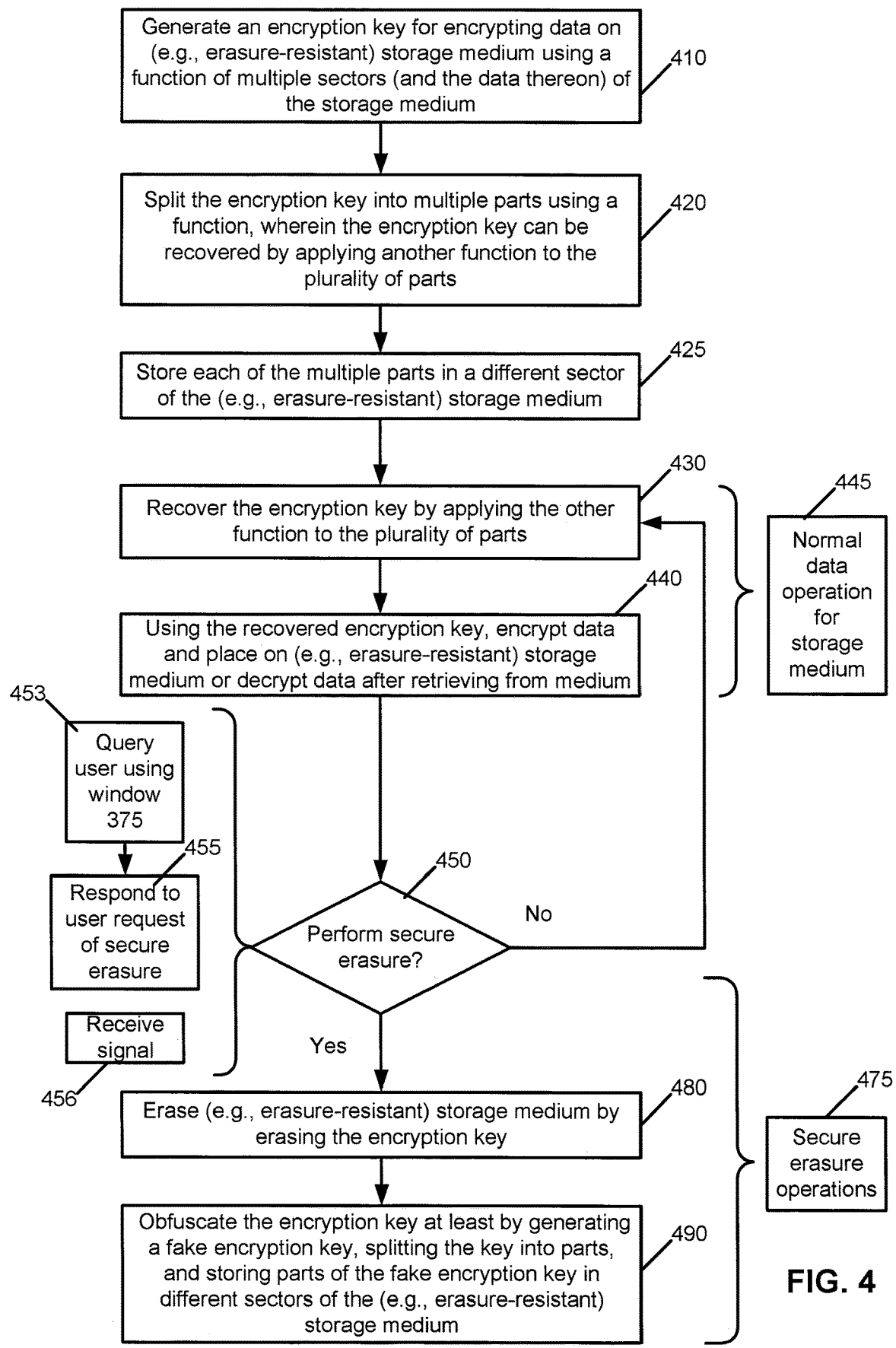
FIG. 4 is a logic flow diagram for obfuscation of keys on a storage medium to enable storage erasure.

FIG. 4 is a logic flow diagram for obfuscation of keys on a storage medium to enable storage erasure. This figure also illustrates the operation of an exemplary method, a result of execution of computer program instructions embodied on a computer readable memory, functions performed by logic implemented in hardware, and/or interconnected means for performing functions in accordance with exemplary embodiments. The blocks in FIG. 4 are performed in an exemplary embodiment by the computer system 310, under control of the obfuscation and encryption application 340, at least in part. As previously described, some or all of the obfuscation and encryption application 340 may be integrated into an erasure-resistant storage medium 350. If that is the case, then some or all of the blocks would be performed by the erasure-resistant storage medium 350. In the description below, for ease of exposition, it is assumed the computer system 310 performs the blocks.

Figure 5:
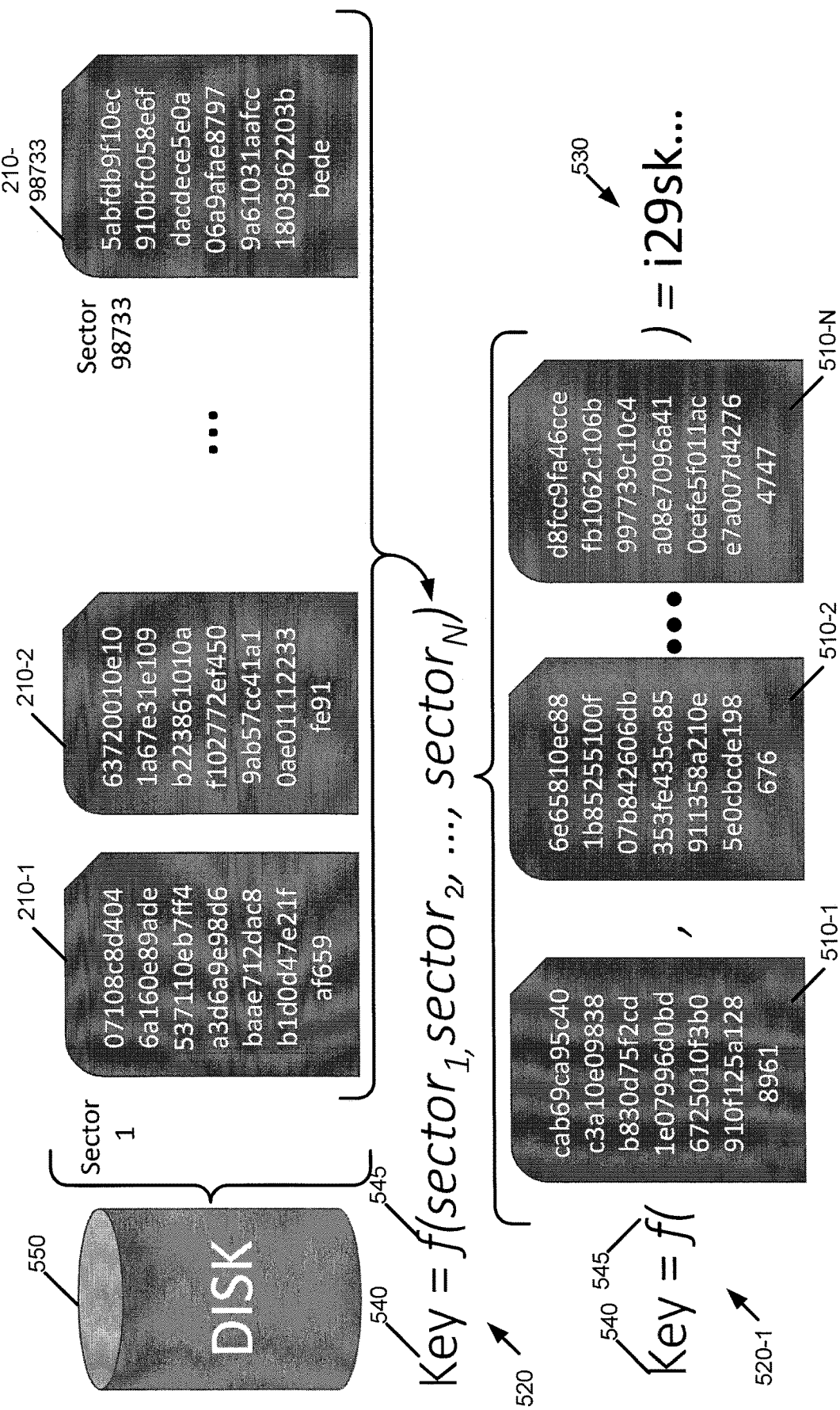
FIG. 5 is an illustration of how a key might be created from sectors of a storage medium.

In block 410, the computer system 310 generates an encryption key for encrypting data on a storage medium using a function of multiple sectors (and the data thereon) of the storage medium. An example of this is illustrated by FIG. 5. Turning to this figure, in this example, the disk 550, which is assumed to be one of the erasure-resistant storage media 350, has sectors 210-1, 210-2, through 210-98733. An equation 520 is used to determine the key, based on certain sectors 210 of the disk 550 and the data in those sectors 210. The equation 520 is illustrated in simple terms as Key=$f$(sector$_1$, sector$_2$, ..., sector$_N$). The key is reference 540 and the function is reference 545. The equation 520 is illustrated visually as equation 520-1, where the function $f(\cdot)$ is a function of the sectors 510-1, 510-2, ..., 510-N, which are selected from the 98,733 sectors 210 on disk 550. Thus, the key 540 is determined using random data from N sectors 510 of the 98733 sectors 210 of disk 550. The value of the key 540 is illustrated by reference 530.

One possible function 545 is as follows. Assume $s_i$=256 bit unsigned integer in a corresponding i-th sector of the disk. The equation 520 is represented as follows:

$$Key = f(s_1, s_2, \ldots, s_N), \text{ or}$$

$$Key = rot_0(s_1) + rot_1(s_2) + \ldots + rot_{N-1}(s_N) \bmod 2^{256}, \text{ or}$$

$$Key = \Sigma_{i=1}^{N} rot_{i-1}(s_i)(\bmod 2^{256}).$$

The $rot_0(\cdot)$ is the rotate function, where bytes are rotated. For instance, rotating 110 by one (to the left) would be 101, and rotating it by two would lead to 011. There are no theoretical limits for N (up to anything feasible in an actual system). In this equation, order matters. As for security, without any single $s_i$, guessing the key will take $2^{256}$ guesses.

Now that the key 540 has been determined, it is beneficial to protect the header and make the key unguessable. Returning to FIG. 4, in block 420, the computer system 310 splits the encryption key into multiple parts using a function (e.g., $f_1$). The key 540 may be assumed to be a generic key consisting of a string of bytes that will be used in a standard encryption algorithm, for instance. The encryption key can be recovered by applying another function (e.g., $f_2$) to the multiple parts.

It is noted that sector/block sizes are usually a fixed size, i.e. 512/4K (where K=1024). The assumptions are as follows. Based on block size, we can manipulate the writes such that a block will contain only raw data. We will be able to do this on a file system (FS) level or by writing directly to disk. Based on a disk, assume 256 logical units are created, each of which will signify a sector. These units may be indexed by either:
1. Offsetting into a disk partition; or
2. Creating a file in the file system.

These are used to store the multiple parts of the key. In block 425, the computer system 310 stores each of the multiple parts in a different sector of the (e.g., erasure-resistant) storage medium, e.g., using the techniques just described.

Figure 6:
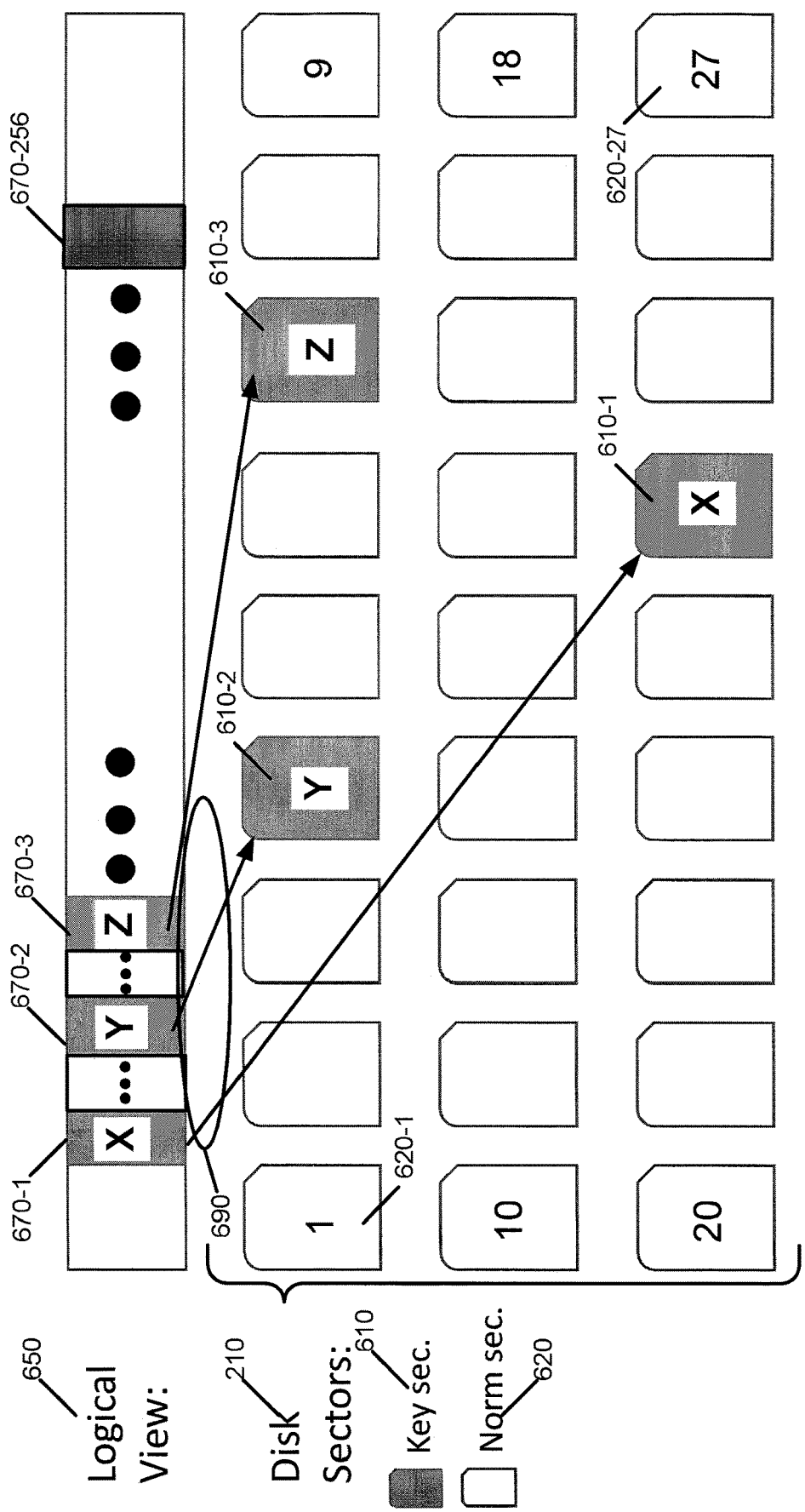
FIG. 6 is an illustration of how multiple parts of a key might be stored in different sectors of the erasure-resistant storage medium.

Referring to FIG. 6, this figure is an illustration of how multiple parts of a key might be stored in different sectors of the erasure-resistant storage medium. Specifically, the key has been split using function $f_1$ into 256 units, each of which will reside in one disk sector 210 each. In this example, the logical view 650 is an OS view of data, and the key 540 is split into 256 logical segments X 670-1, Y 670-2, Z 670-3, ..., 670-256, which have been assigned based on the function in the logical view 650 to corresponding segments 670. The logical view 650 is completely separate from the actual storage locations on the storage medium where the parts of the key are stored. There are 27 disk sectors 210 shown, which are shown as normal sectors 620 and key sectors 610. The normal sectors 620 are a portion of the disk sectors 210 and include the key sectors 610. The sectors 210 holding parts of the key 540 are as follows: key sector 610-1, disk sector number 620-26, which holds logical segment X 670-1; key sector 610-2, disk sector number 640-4, which holds logical segment Y 670-2; and key sector 610-3, disk sector number 620-7, which holds logical segment Z 670-3. Only the first three logical segments 670 are shown being mapped to these 27 sectors, and other segments 670 would be mapped elsewhere.

There is a mapping 690 which maps each of the logical segments 620 to a corresponding sector 610. The mapping 690 is a typically a function handled by the file system, operating system, or application (e.g., could be put into an SSD or other storage device, also). The mapping 690 can also be something programmed in the algorithm itself, e.g., "always look in the first 256 logical sectors of disk". As another example, the mapping 690 can be specified in a starting region of the disk to indicate the logical locations of the sectors on disk. An example would be an implicit mapping in an SSD that maps the ranges such as [513, 1024] maps to sector 25 and [1024, 1535] maps to sector 4, and [1536, 2047] maps to sector 6. When an erasure or overwrite is performed on the disk, these logical mappings will no longer be valid, since those physical sectors are no longer logically mapped (i.e., the logical segments have been erased, meaning the mapping is no longer valid for those segments).

Now that the logical segments 670, the disk sectors 210, and the mapping 690 between these have been introduced, it is helpful to consider an example where the key 540 is to be in 256 logical segments 670 of an erasure-resistant storage medium 350. In order to perform block 410 of FIG. 4, the obfuscation and encryption application 340 would read from, e.g., a randomly selected 256 physical key sectors 610 by reading a randomly selected 256 random logical segments 670. The first 256 logical sectors of the medium could also be used, and these first 256 segments 670 correspond to 256 sectors 610 (of all the sectors 210), based on the mapping 690. This assumes one logical segment 670 is equivalent to one disk sector 210, which is typically the case but is not required, as pages or the like may also be used. This is arbitrary in terms of a logical sector/page, as writing to the disk from the OS standpoint, the OS 335 would only be seeing the logical segments 670.

The translation from logical segments 670 to physical key sectors 610 is performed somewhere, likely by a controller for the erasure-resistant storage medium 350. That is, the interface to the medium 345 is the logical segments 670 and those sectors are mapped via mapping 690 to actual physical key sectors 610 of all the sectors 210 that are on the device by the disk controller (e.g., logic in the medium 345). This would likely be some sort of virtual translation performed in a medium like SSD 350-1.

This logical translation would be stored somewhere in the medium's controller (e.g., in the case of SSDs, in volatile memory and then saved onto non-volatile memory when the device is switched off). This logical translation is therefore usually handled not by the obfuscation and encryption application 340 but by another mechanism, which has different guarantees of "secure-erasability" depending on the mechanism.

Thus, when block 420 of FIG. 4 is performed, the obfuscation and encryption application 340 would take the determined key 540 and place the split (also called sharded) key 540 into 256 logical sectors 670, as illustrated in FIG. 6. These logical sectors 670 are mapped to the key sectors 610, as defined by the mapping 690.

Referring back to FIG. 4, in block 445, the computer system 310 operates using the key 540 to encrypt and decrypt data. This is normal operation for system that uses a key 540 for data operations. Block 445 comprises blocks 430 and 440. The computer system 310 in block 430 recovers the encryption key, e.g., by applying the other function $f_2$ to find and reconstruct the plurality of parts of the key. The parts are read by reading the logical segments 670 on the disk 550, and also by fetching the actual key parts using the mapping 690 (see FIG. 6). The actual fetching is a function handled by the file system, operating system, or application. The computer system 310 in block 440, using the recovered encryption key, encrypts data and places encrypted data on the (e.g., erasure-resistant) storage medium or decrypts data after retrieving the data from the medium. Note that the encryption would typically be used to encrypt all data stored on the storage medium, although it is possible encryption would be applied to only some but not all of the data.

It is noted that program code for block 445 (and therefore blocks 430 and 440) would likely be stored in RAM 330, in order to provide fast encryption and decryption of data. For example, these could be stored in processor cache memory, which provides very fast execution. In a case where these operations are performed by the erasure-resistant storage medium 350 itself, these could be stored in special fast memory for this purpose and/or these may be implemented in hardware, e.g., in an integrated circuit.

If secure erasure is not to be performed, block 450=No, then normal operation continues to occur in block 445. It is assumed that erasure of erasure-resistant storage medium 350 is an infrequent event. As such, it is assumed block 445 is the typical operation and would be interrupted by a request to perform secure erasure.

In case such secure erasure is to be performed (block 450=Yes), then secure erasure operations in block 475 are to be performed. One technique for triggering secure erasure is provided by responding to a user request in block 455 to erase the medium, such as a user 360 interacting with the window 375 (and therefore the obfuscation and encryption application 340) in the GUI 370 and selecting the YES button 381-1. See FIG. 3 for these elements. The obfuscation and encryption application 340 queries the user in block 453, e.g., using the window 375 and its buttons 381. Note that other techniques may be used, such as use of a pulldown menu, spoken word, a particular swipe or swipes on a touchscreen, and the like. Since this is a significant event, there could also be one or more confirmations of erasure before the erasure is actually performed.

The obfuscation and encryption application 340 would, responsive to the user choice of button 381-1 (or some other GUI element) in block 455, start the process of secure erasure in block 475. In a case where these operations are performed by the erasure-resistant storage medium 350 itself, the erasure-resistant storage medium 350 could receive a signal (block 456) from, e.g., a part of the erasure-resistant storage medium 350 that is executing on the computer system 310 and interacting with the user 360. The signal in block 456 may be created and received through other techniques. For instance, a smartphone that is lost or a television or other electronic device that has been stolen may be sent a "kill" signal from the carrier, and that kill signal would be the signal in block 456. The OS 335 of a smartphone might send such a signal in block 446 should a person try to unlock the phone a certain number of times. Other operations are possible.

Block 475 comprises blocks 480 and 490. In block 480, the computer system 310 erases the (e.g., erasure-resistant) storage medium by erasing the encryption key. In particular, the logical instantiation of the key 540 is deleted. This could be done, for instance, by performing one or more of marking the logical segments 670 as empty, writing zeros over the logical segments 670, and the like.

Figure 7:
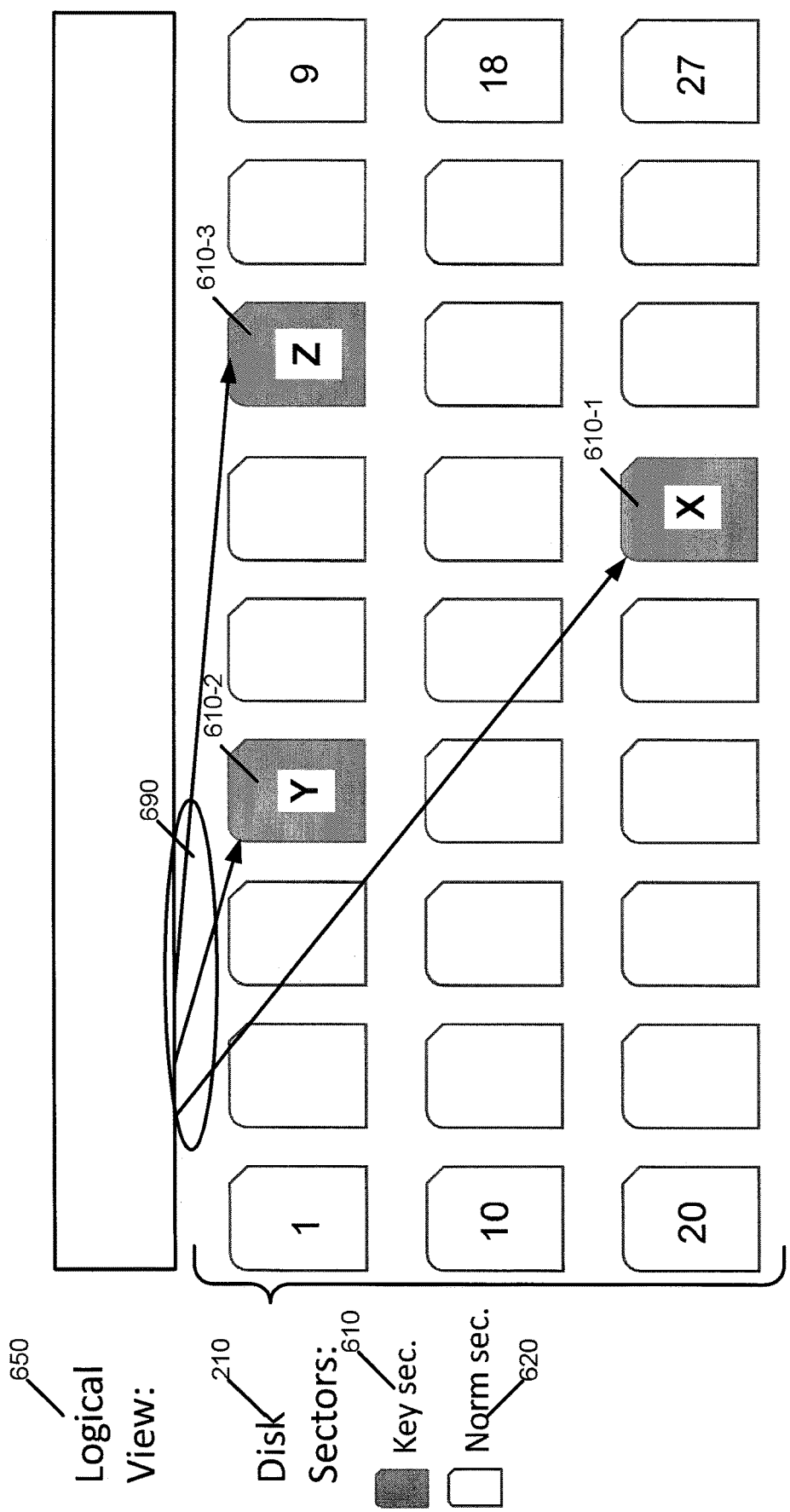
FIG. 7 is an illustration of deletion of the logical instantiation of the key using the illustration of FIG. 6.

An example of this is illustrated by FIG. 7, which illustrates deletion of the logical instantiation of the key using the illustration of FIG. 6. It is seen in FIG. 7 that the logical segments 670 in the logical view 650 of the key 540 has been deleted. Typically, the physical instantiation of the key 540 on the sectors 610 are not deleted (such as being overwritten), although that is possible.

Regarding security at this point, assuming an attacker is able to identify key sectors: If the order of the elements in function f (reference 545 in FIG. 5) matters, then Θ(N!), else Θ(1) to break. As stated above, the order of the elements in function f 545 would typically matter, although is not required.

Figure 8:
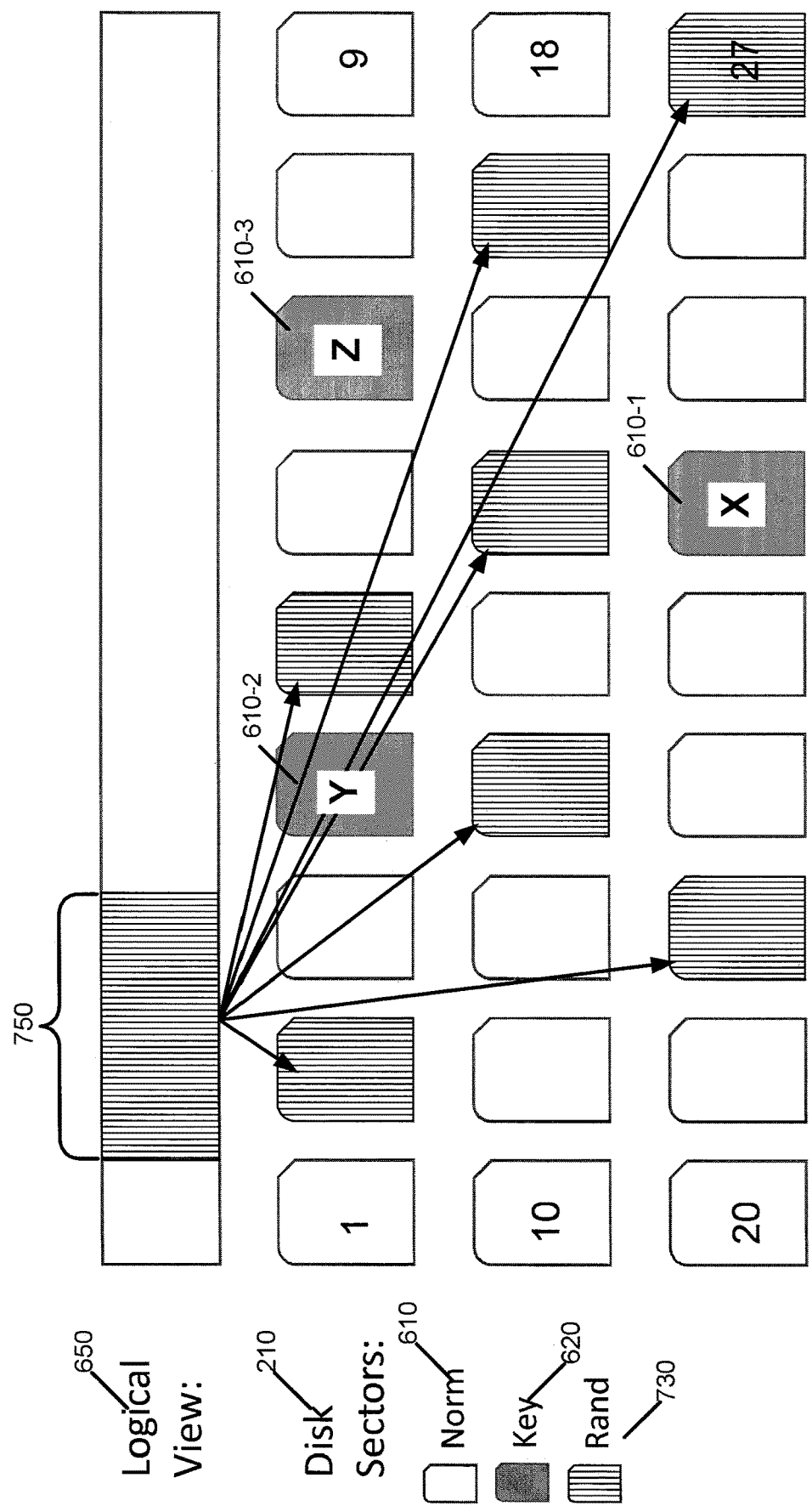
FIG. 8 is an illustration of storing fake encryption parts using the illustration of FIG. 7.

Referring back to FIG. 4, in block 490, the computer system 310 obfuscates the encryption key at least by generating a fake encryption key, and potentially also splitting the fake encryption key into multiple parts, and storing multiple parts of the fake encryption key in different sectors of the (e.g., erasure-resistant) storage medium. An example of this is illustrated in FIG. 8, which shows storing fake encryption parts using the illustration of FIG. 7. In this example, the fake encryption key parts are in the logical segments 750, which are subsequently spread about the disk sectors 210, ending in disk sectors 2, 5, 13, 15, 17, 22, and 29 for random (Rand) sections 730. These fake encryption key parts could overwrite individual sectors of the real key, e.g., randomly, along with being in other locations (as shown in FIG. 8). One might generate the fake key using the same technique (but with different data) as used to generate the real key, or use random data for the fake encryption key parts, and the like.

The security of the techniques after block 490 is as follows. Assuming the attacker is able to identify key sectors: If the order of elements of the function f (e.g., reference 545 in FIG. 5) matters, then Θ

$$\left(\binom{kN}{N}N!\right),$$

else Θ

$$\left(\binom{kN}{N}\right)$$

to break. Again, the order of elements typically matters, though is not required.

Additional examples are as follows.

Example 1

This example is a method that comprises receiving, by an apparatus, a signal to perform secure erasure of a storage medium, and erasing, by the apparatus and responsive to reception of the signal, the storage medium by performing operations. Those operations include erasing an encryption key that is stored on the storage medium and that is used to encrypt data on the storage medium, and generating a fake encryption key that is different from the encryption key. The operations further include storing the fake encryption key on the storage medium.

Example 2

This example relies on the method of example 1, and further comprises splitting the encryption key into multiple parts using a function, and storing each of the multiple parts in different parts of the storage medium. Example 3. This example builds off the method of example 2, and further comprises recovering the encryption key from the storage medium using another function. Example 4. This example builds off the method of example 1, wherein the encryption key is stored on the storage medium in multiple parts and the method further comprises: recovering the encryption key from the multiple parts on the storage medium; and performing one or both of the following: encrypting data using the recovered encryption key and writing the data to the storage medium; or retrieving data from the storage medium and decrypting data using the recovered encryption key.

Example 5

This example also relies on the method of example 1, wherein: the method further comprises querying a user to determine whether or not the user wants the storage medium erased; the receiving the signal occurs responsive to the user selecting to have the storage medium erased. Example 6. In this example, method of example 1 is relied upon. The apparatus is a computer system comprising the storage medium. As a different example, Example 7, this example relies on the method of example 1, wherein the apparatus is the storage medium. Example 8 also relies example 1, where the method further comprises generating the encryption key using a function of multiple parts and their corresponding data of the storage medium. Example 9. The method of example 9, wherein generating the key uses the following formula to generate the key: Key=f(sector1, sector2, . . . , sectorN), where Key is the key, each of sector1, sector2, . . . , sectorN is one of N sectors on the storage medium and contain data used in function $f(\cdot)$, and $f(\cdot)$ is a function of the N sectors.

Example 10

This example builds off the method of example 1, wherein: the method further comprises splitting the fake encryption key into multiple parts; and storing the fake encryption key on the storage medium further comprises storing each of the multiple parts of the fake encryption key in a different part of the medium.

Example 11

This example is computer program product. The computer program product includes a computer readable storage medium having program instructions embodied therewith, the program instructions executable by a device to cause the device to perform operations of any of the methods of examples 1 to 10.

Example 12

This example is an apparatus that comprises circuitry configured to perform operations of any of the methods of examples 1 to 10.

Example 13

This example relies on the apparatus of example 12, and illustrates one possible apparatus. For instance, the apparatus is a computer system that accesses the storage medium. The computer system comprises one or more processors and a memory comprising computer readable code, wherein the one or more processors cause the apparatus to perform the methods in example 12 in response to retrieval and execution of the computer readable code. The computer system may comprise the storage medium, as an internal device, and therefore access the storage medium through one or more internal buses, or may access the storage medium via a USB port for instance.

Example 14

As a different apparatus, this example relies on the apparatus of example 12, wherein the apparatus is the storage medium.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following abbreviations that may be found in the specification and/or the drawing figures are defined as follows:

AES advanced encryption standard
ASCII American standard code for information interchange
COW copy on write
FS file system
GUI graphical user interface
HDD hard disk drive
I/F interface
OS operating system
RAM random access memory
Rand random
SD secure digital
SSD solid state drive
UI user interface

What is claimed is:

1. A method, comprising:
receiving, by an apparatus, a signal to perform secure erasure of a storage medium; and
erasing, by the apparatus and responsive to reception of the signal, the storage medium by performing operations comprising:
  erasing a logical view of an encryption key, the logical view mapping to multiple locations where the encryption key is stored on the storage medium, wherein the encryption key is used to encrypt data on the storage medium;
  generating a fake encryption key for the encrypted data, the fake encryption key being different from the encryption key, and wherein using the fake encryption key on the encrypted data will not yield decrypted data upon which the encrypted data is based;
  storing the fake encryption key on the storage medium; and
  storing a logical view of the fake encryption key, the logical view of the fake encryption key mapping to multiple locations where the fake encryption key is stored on the storage medium.

2. The method of claim 1, further comprising:
splitting the encryption key into multiple parts using a function; and
storing each of the multiple parts in different parts of the storage medium.

3. The method of claim 2, further comprising:
recovering, using another function, the encryption key from the multiple parts on the storage medium; and
performing one or both of the following:
  encrypting data using the recovered encryption key and writing the data to the storage medium; or
  retrieving data from the storage medium and decrypting data using the recovered encryption key.

4. The method of claim 1, wherein:
the method further comprises querying a user to determine whether or not the user wants the storage medium erased;
the receiving the signal occurs responsive to the user selecting to have the storage medium erased.

5. The method of claim 1, wherein the apparatus is a computer system that accesses the storage medium.

6. The method of claim 1, wherein the apparatus is the storage medium.

7. The method of claim 2, further comprising generating, prior to the splitting, the encryption key using a function of applied to multiple parts on the storage medium and their corresponding data.

8. The method of claim 1, wherein:
the method further comprises splitting the fake encryption key into multiple parts; and
storing the fake encryption key on the storage medium further comprises storing, based at least on the logical view of the fake encryption key, the multiple parts of the fake encryption key in corresponding ones of the locations of the storage medium.

9. An apparatus comprising circuitry configured to cause the apparatus to perform the following:
receiving, by the apparatus, a signal to perform secure erasure of a storage medium; and
erasing, by the apparatus and responsive to reception of the signal, the storage medium by performing operations comprising:
  erasing a logical view of an encryption key, the logical view mapping to multiple locations where the encryption key is stored on the storage medium, wherein the encryption key is used to encrypt data on the storage medium;
  generating a fake encryption key for the encrypted data, the fake encryption key being different from the encryption key, and wherein using the fake encryption key on the encrypted data will not yield decrypted data upon which the encrypted data is based;
  storing the fake encryption key on the storage medium; and
  storing a logical view of the fake encryption key, the logical view of the fake encryption key mapping to multiple locations where the fake encryption key is stored on the storage medium.

10. The apparatus of claim 9, wherein the circuitry is further configured to cause the apparatus to perform the following:
splitting the encryption key into multiple parts using a function; and
storing each of the multiple parts in different parts of the storage medium.

11. The apparatus of claim 10, wherein the circuitry is further configured to cause the apparatus to perform the following:
recovering, using another function, the encryption key from the multiple parts on the storage medium; and
performing one or both of the following:
  encrypting data using the recovered encryption key and writing the data to the storage medium; or
  retrieving data from the storage medium and decrypting data using the recovered encryption key.

12. The apparatus of claim 9, wherein:
the circuitry is further configured to cause the apparatus to perform the following:
  querying a user to determine whether or not the user wants the storage medium erased; an
the receiving the signal occurs responsive to the user selecting to have the storage medium erased.

13. The apparatus of claim 9, wherein the apparatus is a computer system that accesses the storage medium, and the computer system comprises one or more processors and a memory comprising computer readable code, wherein the one or more processors cause the apparatus to perform operations in response to retrieval and execution of the computer readable code.

14. The apparatus of claim 9, wherein the apparatus is the storage medium.

15. The apparatus of claim 10, wherein the circuitry is further configured to cause the apparatus to perform the following: generating, prior to the splitting, the encryption key using a function applied to multiple parts on the storage medium and their corresponding data.

16. The apparatus of claim 9, wherein:
wherein the circuitry is further configured to cause the apparatus to perform the following: splitting the fake encryption key into multiple parts; and
storing the fake encryption key on the storage medium further comprises storing, based at least on the logical view of the fake encryption key, the multiple parts of the fake encryption key in corresponding ones of the locations of the storage medium.

17. A computer program product comprising a computer readable storage medium having program instructions embodied therewith, the program instructions executable by an apparatus to cause the apparatus to perform operations comprising:
receiving, by an apparatus, a signal to perform secure erasure of a storage medium; and
erasing, by the apparatus and responsive to reception of the signal, the storage medium by performing operations comprising:
erasing a logical view of an encryption key, the logical view mapping to multiple locations where the encryption key is stored on the storage medium, wherein the encryption key is used to encrypt data on the storage medium;
generating a fake encryption key for the encrypted data, the fake encryption key being different from the encryption key, and wherein using the fake encryption key on the encrypted data will not yield decrypted data upon which the encrypted data is based;
storing the fake encryption key on the storage medium; and
storing a logical view of the fake encryption key, the logical view of the fake encryption key mapping to multiple locations where the fake encryption key is stored on the storage medium.

18. The computer program product of claim 17, wherein the program instructions cause the apparatus to perform operations comprising:
splitting the encryption key into multiple parts using a function; and
storing each of the multiple parts in different parts of the storage medium.

19. The computer program product of claim 18, wherein the program instructions cause the apparatus to perform operations comprising: generating, prior to the splitting, the encryption key using a function applied to multiple parts on the storage medium and their corresponding data.

20. The computer program product of claim 17, wherein:
wherein the program instructions cause the apparatus to perform operations comprising: splitting the fake encryption key into multiple parts; and
storing the fake encryption key on the storage medium further comprises storing, based at least on the logical view of the fake encryption key, the multiple parts of the fake encryption key in corresponding ones of the locations of the storage medium.

* * * * *